(12) United States Patent
Egashira

(10) Patent No.: US 11,292,181 B2
(45) Date of Patent: Apr. 5, 2022

(54) METHOD FOR MANUFACTURING SHEET LAMINATE

(71) Applicant: 3M INNOVATIVE PROPERTIES COMPANY, St. Paul, MN (US)

(72) Inventor: Ken Egashira, Kanagawa (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 104 days.

(21) Appl. No.: 16/470,403

(22) PCT Filed: Dec. 19, 2017

(86) PCT No.: PCT/IB2017/058160
§ 371 (c)(1),
(2) Date: Jun. 17, 2019

(87) PCT Pub. No.: WO2018/122683
PCT Pub. Date: Jul. 5, 2018

(65) Prior Publication Data
US 2020/0122383 A1 Apr. 23, 2020

(30) Foreign Application Priority Data
Dec. 28, 2016 (JP) .............................. JP2016-255468

(51) Int. Cl.
*B29C 53/84* (2006.01)
*B29C 51/14* (2006.01)
(Continued)

(52) U.S. Cl.
CPC .............. *B29C 53/84* (2013.01); *B29C 51/14* (2013.01); *B29C 53/005* (2013.01); *B29C 53/02* (2013.01);
(Continued)

(58) Field of Classification Search
None
See application file for complete search history.

(56) References Cited

U.S. PATENT DOCUMENTS

| 4,466,848 A * | 8/1984 | Ogawa ................ B29C 43/203 156/242 |
| 2013/0081756 A1* | 4/2013 | Franklin ................ B29C 53/04 156/221 |

(Continued)

FOREIGN PATENT DOCUMENTS

| JP | 2586550 | 8/1989 |
| JP | 06344043 A2 | 12/1994 |

(Continued)

OTHER PUBLICATIONS

International Search report for PCT International Application No. PCT/IB2017/058160 dated Mar. 8, 2018, 4 pages.

*Primary Examiner* — Barbara J Musser
(74) *Attorney, Agent, or Firm* — 3M Innovative Properties Company

(57) ABSTRACT

A method for manufacturing a sheet laminate to be affixed to an adherent surface of an object, the method comprising preparing a sheet member having a front surface to become a design surface and a rear surface on which an adhesive part has been formed, bending an edge part of the sheet member by sandwiching the sheet member from a front surface side and a rear surface side in a mold, and heating a part of a bent sheet member. The sheet laminate has a flat part spreading out in a flat plate shape, a side surface on which the edge part bent by the bending step is configured, and a connecting surface protruding and curving toward the front surface side between the flat part and the side surface, and in the heating step, the connecting surface is partially heated after the side surface is molded in the bending step.

6 Claims, 13 Drawing Sheets

(51) Int. Cl.
  *B29C 53/00*  (2006.01)
  *B29C 53/04*  (2006.01)
  *B32B 37/12*  (2006.01)
  *B32B 38/00*  (2006.01)
  *B29C 53/02*  (2006.01)
  *B29K 105/00*  (2006.01)
  *B32B 27/08*  (2006.01)
  *B32B 27/36*  (2006.01)
  *B32B 37/26*  (2006.01)

(52) U.S. Cl.
  CPC .............. *B29C 53/04* (2013.01); *B32B 37/12* (2013.01); *B32B 38/004* (2013.01); *B29K 2105/0097* (2013.01); *B32B 27/08* (2013.01); *B32B 27/365* (2013.01); *B32B 2037/268* (2013.01); *B32B 2405/00* (2013.01); *Y10T 156/10* (2015.01); *Y10T 156/1002* (2015.01)

(56) References Cited

U.S. PATENT DOCUMENTS

| | | |
|---|---|---|
| 2015/0352774 A1 | 12/2015 | Iwano |
| 2016/0115356 A1 | 4/2016 | Free |

FOREIGN PATENT DOCUMENTS

| | | |
|---|---|---|
| JP | 2009056605 | 3/2009 |
| JP | 2015214033 A2 | 12/2015 |
| WO | WO 2014/153660 | 10/2014 |
| WO | WO 2015/062540 | 5/2015 |

\* cited by examiner

METHOD FOR MANUFACTURING SHEET LAMINATE

CROSS REFERENCE TO RELATED APPLICATIONS

This application is a national stage filing under 35 U.S.C. 371 of PCT/IB2017/058160, filed Dec. 19, 2017, which claims the benefit of Japan Application No. 2016-255468, filed Dec. 28, 2016, the disclosures of which are incorporated by reference in their entireties herein.

TECHNICAL FIELD

The present invention relates to a method for manufacturing a sheet laminate, a mold for molding a sheet laminate, and a sheet laminate.

BACKGROUND

A molding method called stamping is known as a conventional method for manufacturing a sheet laminate (for example, see Japanese Patent JP 2015-229279). In particular, a processing method for sandwiching a sheet in a heated mold and then bending the sheet is referred to as heat stamping.

SUMMARY OF THE INVENTION

Thus, there is a requirement to bend an edge part of a sheet laminate having an adhesive part on a rear surface and a protective sheet on a front surface. However, this presents a problem in that when heat stamping like that described above is performed with respect to this type of sheet laminate, the adhesive part, a liner, and the protective sheet peel away during molding. There is a demand to resolve this type of problem by manufacturing a bent sheet laminate.

A method for manufacturing a sheet laminate according to an embodiment of the present invention is a method for manufacturing a sheet laminate to be affixed to an adherent surface of an object and is provided with a preparing step for preparing a sheet member having a front surface to become a design surface and a rear surface on which an adhesive part has been formed, a bending step for bending an edge part of the sheet member by sandwiching the sheet member from a front surface side and a rear surface side in a mold, and a partial heating step for heating a part of a bent sheet member, where the sheet laminate has a flat surface part spreading out in a flat plate shape, a side surface on which the edge part bent by the bending step is configured, and a connecting surface protruding and curving toward the front surface side between the flat surface part and the side surface, and in the partial heating step, the connecting surface is partially heated after the side surface is molded in the bending step.

With this kind of embodiment, the sheet laminate has the flat surface part spreading out in a flat plate shape, the side surface on which the edge part bent by the bending step is configured, and the connecting surface protruding and curving toward the front surface side between the flat surface part and the side surface. After the sheet member has been bent into this kind of shape in the bending step, the connecting surface is partially heated in the partial heating step. When the sheet member is molded in a state where the adhesive part has been formed, the adhesive part becomes susceptible to peeling in a position corresponding to the connecting surface that deforms so as to curve in the bending step. Accordingly, distortion in said part can be removed by performing a partial annealing process through partial heating of the connecting surface. Therefore, adhesive part peeling can be prevented and a good quality sheet laminate can be manufactured. A bent sheet laminate can be provided as described above.

With a method for manufacturing a sheet laminate according to another embodiment, a main body part for configuring the flat surface part of the sheet laminate, and a pair of side wall parts extending respectively toward the rear surface side from a pair of mutually intersecting main body part side parts are molded by the bending step, where the side surface has a first side surface corresponding to one side wall part of the pair of side wall parts, a second side surface corresponding to the other side wall part of the pair of side wall parts, and a third side surface forming a roundness having a predetermined curvature formed in a corner part between the first side surface and the second side surface, and the connecting surface has a first connecting surface for connecting the flat surface part and the first side surface, a second connecting surface for connecting the flat surface part and the second side surface, and a third connecting surface for connecting the flat surface part and the third side surface.

In the method for manufacturing a sheet laminate according to another embodiment, the connecting surface is exposed from the mold in the partial heating step, and partial heating is performed by applying heat to the connecting surface from outside the mold.

In the method for manufacturing a sheet laminate according to another embodiment, partial heating is performed in the partial heating step through a part in the mold that makes contact with the connecting surface.

In the method for manufacturing a sheet laminate according to another embodiment, heat going to the flat surface part and the side surface may be insulated in the partial heating step.

In the method for manufacturing a sheet laminate according to another embodiment, the sheet member may also be provided with a release liner covering the adhesive part of the rear surface of the sheet member.

A mold for molding the sheet laminate according to an embodiment of the present invention is a mold for molding a sheet laminate to be affixed to an adherent surface of an object. The mold is provided with a first unit for supporting a sheet member, having a front surface to become a design surface and a rear surface where an adhesive part is formed, from a front surface side, and a second unit for supporting the sheet member from a rear surface side; where the first unit and the second unit are able to mold a main body part spreading in a flat plate shape and a pair of side wall parts extending respectively toward a rear surface side from a pair of mutually intersecting main body part side parts by sandwiching the sheet member and bending an edge part of the sheet member; and where, when the front surface has a flat surface part corresponding to the main body part, a first side surface corresponding to one side wall part of the pair of side wall parts, a second side surface corresponding to the other side wall part of the pair of side wall parts, and a third side surface forming a roundness having a predetermined curvature formed in a corner part between the first side surface and the second side surface, a first connecting surface protruding curving toward the front surface side for connecting the flat surface part and the first side surface, a second connecting surface protruding curving toward the front surface side for connecting the flat surface part and the second side surface, and a third connecting surface protruding curving toward the front surface side for connecting the flat surface part and the third side surface; the first unit supports the flat surface part, the first side surface, the second side surface, and the third side surface in a state where the first connecting surface, the second connecting surface and the third connecting surface are exposed.

The mold for molding the sheet laminate according to an embodiment of the present invention is a mold for molding a sheet laminate to be affixed to an adherent surface of an object. The mold is provided with a first unit for supporting a sheet member, having a front surface to become a design surface and a rear surface where an adhesive part is formed, from a front surface side, and a second unit for supporting the sheet member from a rear surface side; where the first unit and the second unit are able to mold a main body part spreading in a flat plate shape sandwich in the sheet laminate and a pair of side wall parts each extending toward a rear surface side from a pair mutually intersecting main body part side parts by sandwiching the sheet member and bending an edge part of the sheet member; and where, when the front surface has a flat surface part corresponding to the main body part, a first side surface corresponding to one of the side wall parts of the pair of side wall parts, a second side surface corresponding to the other of the side wall parts of the pair of side wall parts, and a third side surface forming a roundness having a predetermined curvature formed in a corner part between the first side surface and the second side surface, a first connecting surface protruding curving toward the front surface side for connecting the flat surface part and the first side surface, a second connecting surface protruding curving toward the front surface side for connecting the flat surface part and the second side surface, and a third connecting surface protruding curving toward the front surface side for connecting the flat surface part and the third side surface; the first unit is provided with a heating part for heating a part in contact with the first connecting surface, the second connecting surface and the third connecting surface, and an insulating part for insulating a space between the flat surface part, the first side surface, the second side surface, and the third side surface.

A sheet laminate according to an embodiment of the present invention is a sheet laminate that is to be affixed to an adherent surface of an object and has a flat surface part that spreads out in a flat plate shape, a side surface configured by a bent edge of the flat surface part, and a connecting surface protruding and curving toward a front surface side between the flat surface part and the side surface, where a part configuring the flat surface part, the side surface, and the connecting surface is configured of a base material part having a front surface that is to become a design surface and a rear surface on a side opposite the front surface, an adhesive layer formed on the rear surface of the base material part, and a release liner layer covering the adhesive layer that can be peeled from the adhesive layer.

The sheet laminate according to another embodiment is provided with a main body part for configuring the flat surface part, and a pair of side wall parts extending respectively toward the rear surface side from a pair of mutually intersecting main body part side parts; where the side surface has a first side surface corresponding to one side wall part of the pair of side wall parts, a second side surface corresponding to the other side wall part of the pair of side wall parts, and a third side surface forming a roundness having a predetermined curvature formed in a corner part between the first side surface and the second side surface; and where the connecting surface may have a first connecting surface for connecting the flat surface part and the first side surface, a second connecting surface for connecting the flat surface part and the second side surface, and a third connecting surface for connecting the flat surface part and the third side surface.

With the sheet laminate according to another embodiment, the third side surface forms the aforementioned roundness protruding toward the front surface side, and the curvature of the roundness may have a radius of 1 to 2000 mm. With the sheet laminate according to another embodiment, the third side surface forms the aforementioned roundness protruding toward the rear surface side, and the curvature of the roundness may have a radius of 0.5 to 2000 mm.

In the sheet laminate according to another embodiment, a base material layer may be covered with a biaxially extended protective film layer.

In the sheet laminate according to another embodiment, the release liner layer may be configured using a biaxially extended film.

In the sheet laminate according to another embodiment, the adhesive layer may be configured using an acrylic pressure-sensitive adhesive.

In the sheet laminate according to another embodiment, the base material layer may be configured using a polycarbonate.

According to the present invention, a bent sheet laminate can be provided.

DESCRIPTION OF EMBODIMENTS

Detailed descriptions of embodiments according to the present invention are given below with reference to the attached drawings. Note that, in the following descriptions, the same reference symbols have been assigned to elements that are the same or equivalent, and that redundant descriptions thereof have been omitted.

Figure 1:
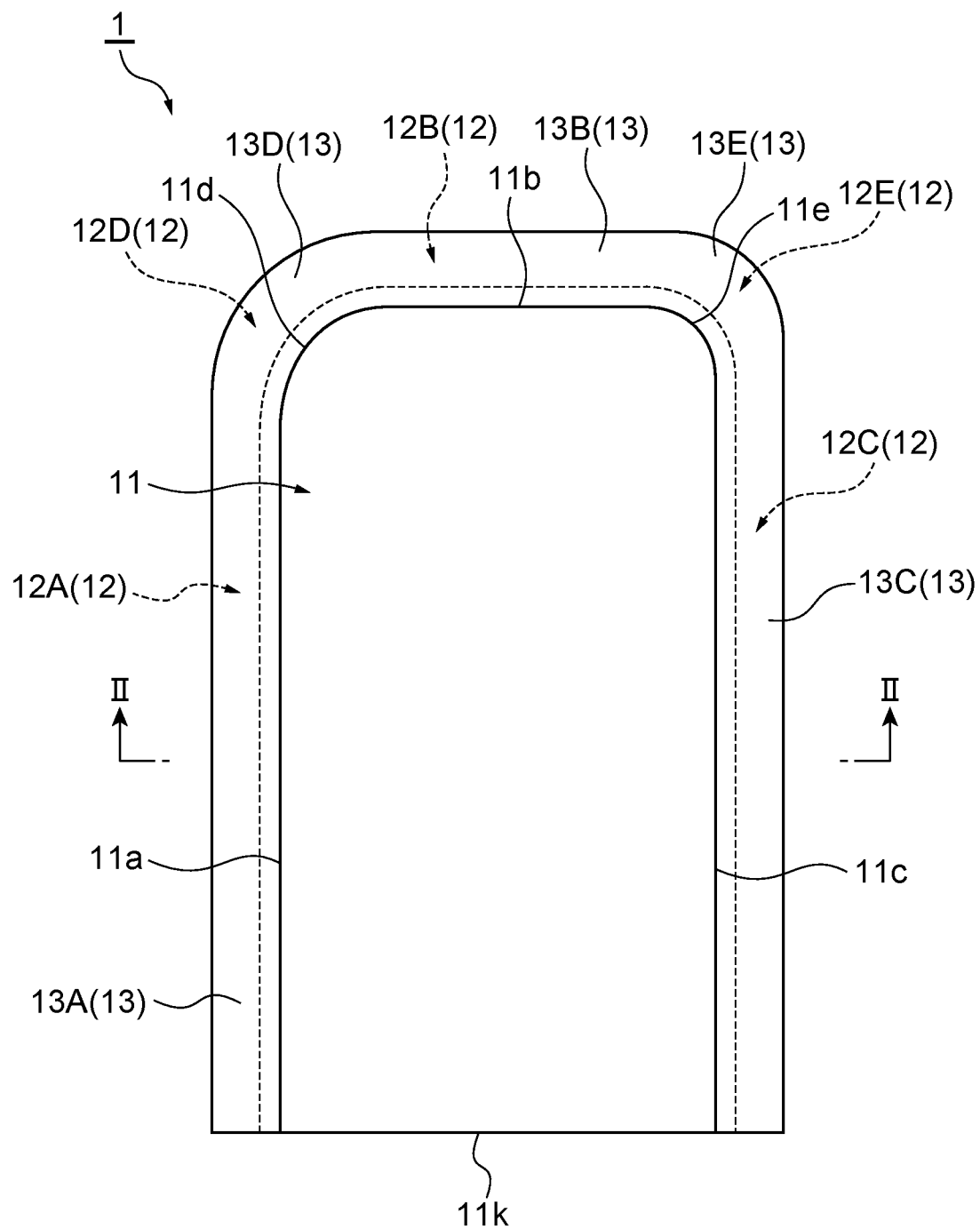
FIG. 1 is a plan view of a sheet laminate as seen from a design surface side.
Figure 2:
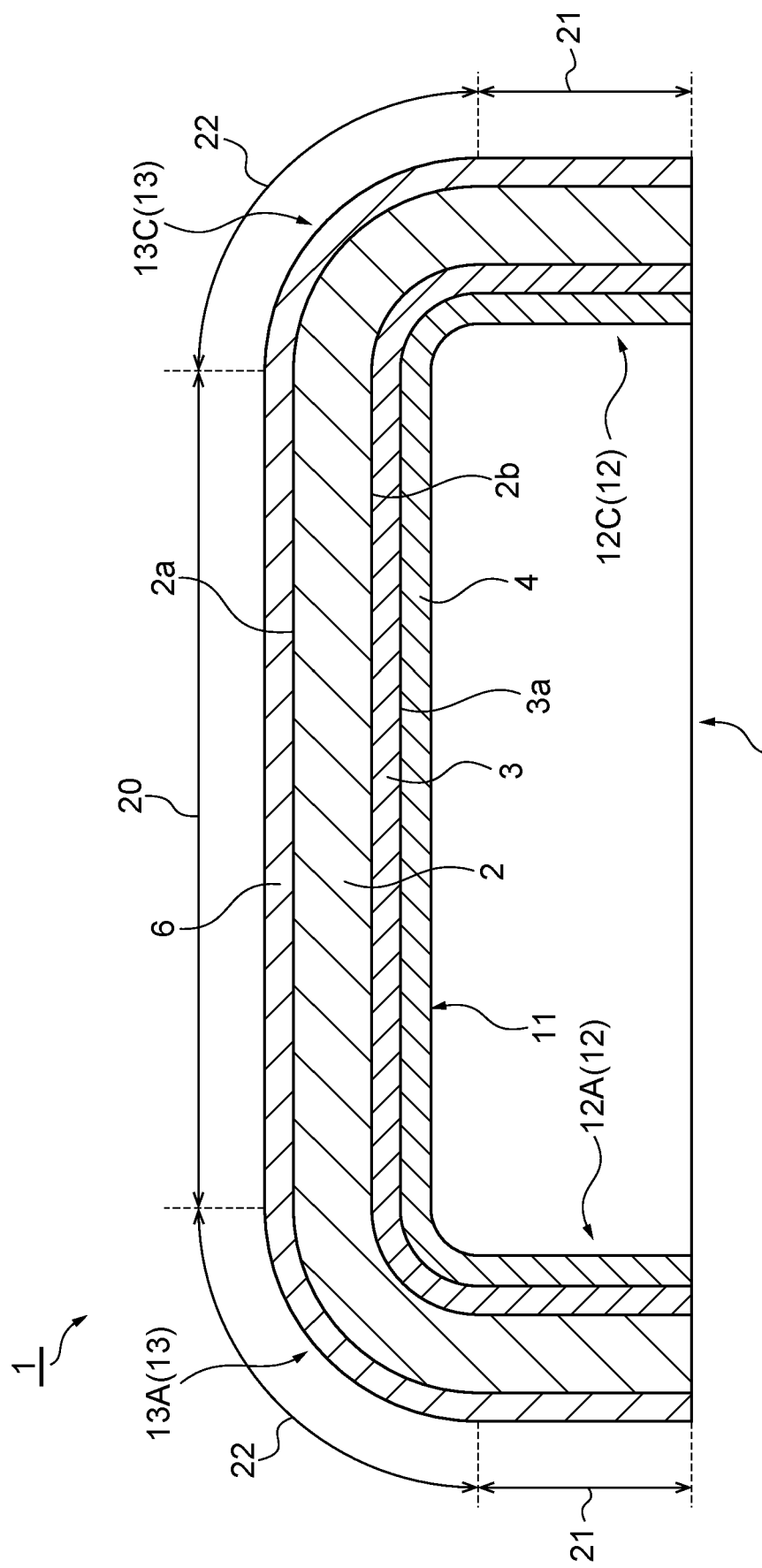
FIG. 2 is a cross sectional view along line II-II illustrated in FIG. 1.

A sheet laminate 1 according to an embodiment of the present invention will be described with reference to FIG. 1 and FIG. 2. FIG. 1 is a plan view of a sheet laminate as seen from a design surface side. FIG. 2 is a cross sectional view along the Line II-II illustrated in FIG. 1. A sheet laminate 1 according to the present embodiment is a member to be affixed to an adherent surface of any object. The sheet laminate 1 has a front surface to become a design surface, and a rear surface to become a sticking surface for the object. This allows the sheet laminate 1 to cover the object so that the design surface faces outward. Examples of objects to which the sheet laminate can be affixed include a vehicle center pillar, rear pillar, door sash, and the like. A sheet member having the surface to become a design surface and a rear surface on which an adhesive part 3 is formed is prepared for the sheet laminate 1, which is a molded product formed by bending an edge of the sheet member using a mold. The configuration of the sheet laminate 1, which is a finished product, will be described here in detail, after that, the method for manufacturing the sheet laminate 1, and the mold used in said method, will also be described in detail.

As illustrated in FIG. 1 and FIG. 2, the sheet laminate 1 is provided with a main body part 11, and a side wall part 12. The main body part 11 is a part spreading out in a flat plate shape taking any form. In the present embodiment, the main body part 11 has a rectangular shape when seen from a thickness direction. However, the shape of the main body part 11 when seen from the thickness direction is not particularly limited, and thus may form a long rectangular shape, a T shape, or a cross shape. In FIG. 1, the main body part 11 has four side parts 11a, 11b, 11c, and 11k. Here, the sides 11a and 11b are orthogonal to one another, the sides 11b and 11c are orthogonal to one another, the sides 11k and 11a are orthogonal to one another, and the sides 11k and 11c are orthogonal to one another, and the intersecting angles are not particularly limited. Furthermore, a curved part 11d is formed by forming a roundness facing outward at a prescribed curvature in a corner where the side part 11a and the side part 11b intersect. A curved part 11e is formed by forming a roundness facing outward at a prescribed curvature in a corner where the side part 11b and the side part 11c intersect.

The side wall part 12 is a wall part extending toward a rear surface side from each of the side parts 11a, 11b, and 11c of the main body part 11. The side wall part 12 is also formed in positions corresponding to the curved parts 11d and 11e of the main body part 11. Specifically, a side wall part 12A is formed in the side part 11a of the main body part 11, a side wall part 12B is formed in the side part 11b thereof, and a side wall part 12C is formed in the side part 11c thereof. Furthermore, a side wall part 12D is formed in the curved part 11d of the main body, and a side wall part 12E is formed in a curved part 11e thereof. The side wall parts 12A through 12E are connected together so as to surround the main body part 11 in a continuous fashion. That is, the side wall part 12A corresponding to the side part 11a and the side wall part 12D corresponding to the curved part 11d are integrally connected. The side wall part 12D corresponding to the curved part 11d and the side wall part 12B corresponding to side part 11b are also integrally connected. The side wall part 12B corresponding to the side part 11b and the side wall part 12E corresponding to curved part 11e are also integrally connected. The side wall part 12E corresponding to the curved part 11e and the side wall part 12C corresponding to side part 11c are also integrally connected. Note that while no side wall part is formed in a position corresponding to the side part 11k in the embodiment of FIG. 1, such a part may be formed.

Furthermore, a connecting part 13 is formed between the main body part 11 and the side wall part 12, and curves so as to protrude toward a front surface side. Connecting parts 13A, 13B, 13C, 13D, and 13E are formed between the main body part 11 and the side wall parts 12A, 12B, 12C, 12D, and 12E, respectively. The connecting parts 13A, 13B, 13C, 13D, and 13E are integrally connected to the main body part 11 and to the side wall parts 12A, 12B, 12C, 12D, and 12E.

As illustrated in FIG. 2, the sheet laminate 1 (also referred to as molded sheet laminate 1) is provided with a base material part (base material layer) 2, an adhesive part (adhesive layer) 3, a release liner (release liner layer) 4, and a protective film (protective film layer) 6. Furthermore, the sheet laminate 1 is configured by molding, as-is, a sheet member formed by laminating the base material part 2, the adhesive part 3, the release liner 4, and the protective film 6. Accordingly, the main body part 11, the side wall part 12, and the connecting part 13 are each provided with the base material part 2, the adhesive part 3, the release liner 4, and the protective film 6.

The base material part 2 is a member that forms a base for the sheet laminate 1. The base material part 2 has a front surface 2a to become a design surface, and a rear surface 2b on a side opposite the front surface 2a. The base material part 2 is configured from a material, such as polycarbonate, PET, ABS resin, and the like. Furthermore, a thickness of the base material part 2 is not particularly limited, and thus may be 0.2 to 1.5 mm. Furthermore, a surface treatment using, for example, polyurethane, acrylic, or the like, is applied to the front surface 2a to become the design surface.

The adhesive part 3 is a member for joining the sheet laminate 1 to an object by adhering to said object. The adhesive part 3 is laminated onto the rear surface 2b of the base material part 2. The adhesive part 3 is laminated onto the rear surface 2b of the base material part 2 so as to cover nearly the entire surface thereof. Of the surfaces of the adhesive part 3, an adhesive surface 3a functions as a surface on a side opposite the base material part 2. The adhesive part 3 is configured from a material, such as acrylic, rubber, and the like. More specifically, the adhesive layer may be configured using an acrylic pressure-sensitive adhesive. Furthermore, a thickness of the adhesive part 3 is not particularly limited, and thus may be 0.005 to 0.4 mm.

The release liner 4 is a member for protecting the adhesive part 3. The release liner 4 covers the entire surface of the adhesive surface 3a of the adhesive part 3. When the sheet laminate 1 is adhered to an object, the release liner 4 is peeled from the adhesive part 3 to thus expose the adhesive part 3. The release liner 4 may be configured using a biaxially extended film. For example, the release liner 4 is provided with a release layer of silicone, and the like, on a biaxially extended material, such as PET, PEN, or the like, and a polyolefin layer of PE, or the like, may also be provided there between. Furthermore, a thickness of the release liner 4 is not particularly limited, and thus may be 0.01 to 0.3 mm.

Because the protective film 6 covers the front surface 2a of the base material part 2, said film serves as a member for protecting the front surface 2a, which is the design surface. The protective film 6 is a biaxially extended film. That is, while the front surface 2a in the connecting part 13 of the base material part 2 deforms so as to stretch somewhat when the sheet laminate 1 is molded from a sheet member state, there is only a small degree of following. The material of the protective film 6 is configured from PET, PEN, or the like. Furthermore, a thickness of the protective film 6 is not particularly limited, and thus may be 0.005 to 0.3 mm.

A surface configuration of the design surface (that is, the front surface 2a of the base material part 2) of the sheet laminate 1 will be described next. The sheet laminate 1 has a flat surface part 20 spreading out in a flat plate shape, a side surface 21 on which a bent edge part of the flat surface part 20 is configured, and a connecting surface 22 protruding and curving toward the front surface 2a side between the flat surface part 20 and the side surface 21. The flat surface part 20 is formed on a part corresponding to the main body part 11 portion of the front surface 2a. The side surface 21 is formed on a part corresponding to the side wall parts 12A through 12E portion of the front surface 2a. The connecting surface 22 is formed on parts corresponding to the connecting parts 13A through 13E portion of the front surface 2a.

The surface configuration of the sheet laminate 1 is described in further detail below with reference to FIG. 3 (a). Note that while FIG. 3 (a) illustrates a configuration in the vicinity of the side wall part 12C, the side wall part 12B, and the side wall part 12E, the same gist holds for descriptions of different parts so long as a pair of mutually intersecting side walls 12 is provided.

Figure 3A:
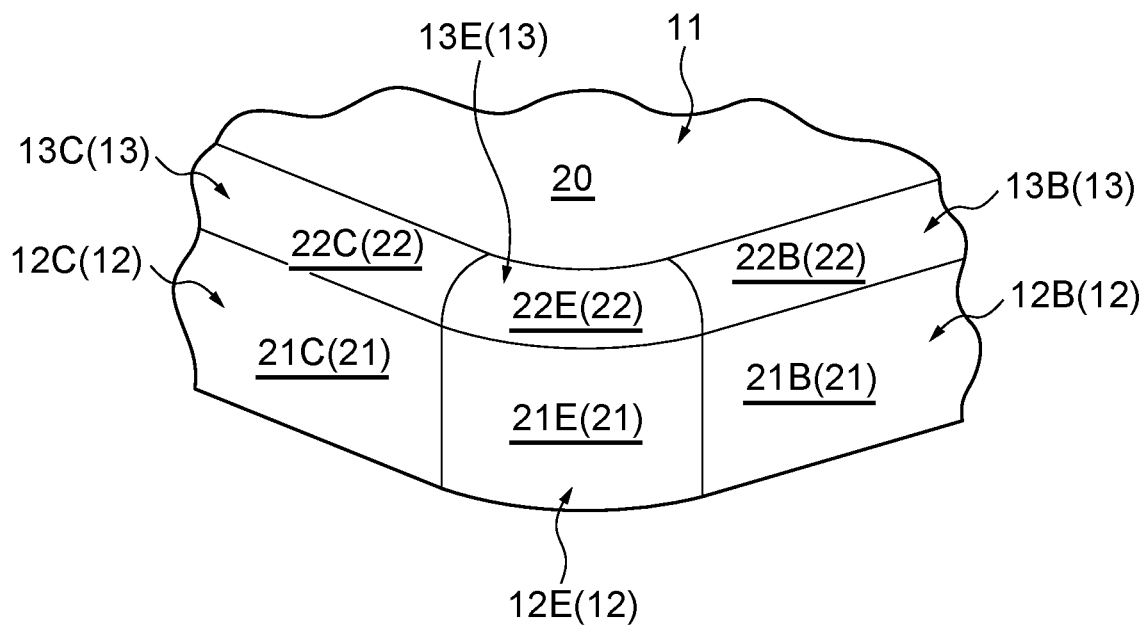
FIG. 3 is a perspective view illustrating a surface configuration of the sheet laminate.
Figure 3B:
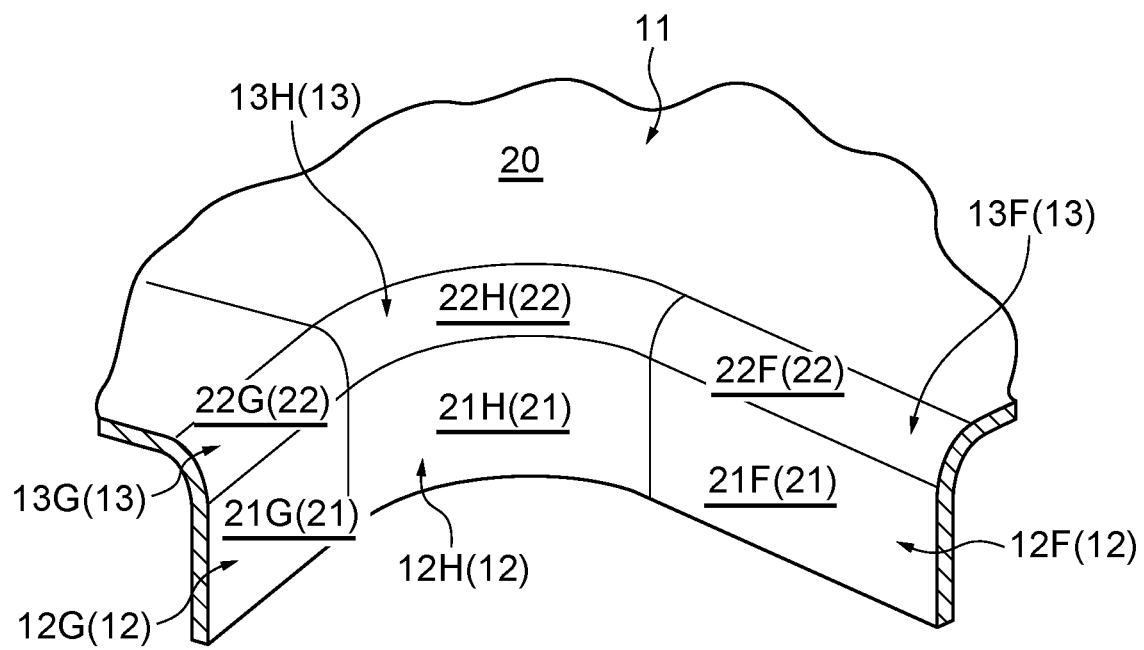

As illustrated in FIG. 3 (a), the flat surface part 20 corresponds to the main body part 11, and forms a primary surface, that is, a flat surface. The side surface 21 has a first side surface 21B corresponding to the side wall part 12B, which is one of the pair made up of the side wall parts 12B and 12C, a second side surface 21C corresponding to the side wall part 12C, which is the other of said pair, and a third side surface 21E corresponding to the side wall part 12E that forms a roundness. The first side surface 21B and the second side surface 21C form a primary surface, that is, a flat surface. The third side surface 21E is formed in a corner between the first side surface 21B and the second side surface 21C, and is a surface for forming a roundness having a predetermined curvature. The third side surface 21E forms a secondary surface, that is, a curved surface having a component bent with reference to a single axis. When seen from a thickness direction of the main body part 11, the third side surface 21E forms a roundness protruding toward the front surface side. A radius of a curvature of the roundness is 1 to 2000 mm. The connecting surface 22 has a first connecting surface 22B for connecting the flat surface part 20 and the first side surface 21B, a second connecting surface 22C for connecting the flat surface part 20 and the second side surface 21C, and a third connecting surface 22E for connecting the flat surface part 20 and the third side surface 21E. The first connecting surface 22B is a secondary surface corresponding to a connecting part 13B. When seen from a thickness direction of the side wall part 12C, the first connecting surface 22B forms a roundness protruding toward the front surface side. A radius of a curvature of the roundness is 0.5 to 200 mm. The second connecting surface 22C is a secondary surface corresponding to a connecting part 13C. When seen from a thickness direction of the side wall part 12B, the second connecting surface 22C forms a roundness protruding toward the front surface side. A radius of a curvature of the roundness is 0.5 to 200 mm. The third connecting surface 22E is a tertiary surface corresponding to a connecting part 13E. The tertiary surface forms a curved surface having a component bent with reference to two axes. The third connecting surface 22E has a curved component of the third side surface 21E and a curved component of the first connecting surface 22B and the second connecting surface 22C.

Note that "first side surface" and "second side surface" are expedient names for clearly describing a structure and thus may be a first side surface 21C and a second side surface 21B. Accordingly, these are sometimes referred to in the following description simply as "side surface" without distinguishing between "first side surface" and "second side surface." Furthermore, "first connecting surface" and "second connecting surface" are also expedient names for clearly describing a structure and thus may be a first connecting surface 22C and a second connecting surface 22B. Accordingly, these are sometimes referred to in the following description simply as "connecting surface" without distinguishing between "first connecting surface" and "second connecting surface."

A structure in a case where a third side surface protrudes toward the front surface side and thus draws a so-called positive curve was described using FIG. 3 (a). However, this may also be a structure where the third side surface protrudes toward the rear surface side and thus draws a so-called negative curve. Specifically, the structure illustrated in FIG. 3 (b) may be used. As illustrated in FIG. 3 (b), a side wall part 12H forming a roundness so as to protrude toward the rear surface side is formed by a corner between a pair of side wall parts 12E and 12G that extend straight from said corner. Furthermore, connecting parts 13F, 13G, and 13H are formed between the main body part 11 and the side wall parts 12F, 12G and 12H, respectively.

In the configuration of FIG. 3 (b), the side surface 21 has a first side surface 21F corresponding to the side wall part 12F, which is one of the pair made up of the side wall parts 12F and 12G, a second side surface 21G corresponding to the side wall part 12G, which is the other of said pair, and a third side surface 21H corresponding to the side wall part 12H that forms a roundness. The first side surface 21F and the second side surface 21G form a primary surface, that is, a flat surface. The third side surface 21H is formed in a corner between the first side surface 21F and the second side surface 21G, and is a surface for forming a roundness having a predetermined curvature. The third side surface 21H forms a secondary surface, that is, a curved surface having a component bent with reference to a single axis. When seen from a thickness direction of the main body part 11, the third side surface 21H forms a roundness protruding toward the rear surface side. A radius of a curvature of the roundness is 0.5 to 2000 mm. The connecting surface 22 has a first connecting surface 22F connecting the flat surface part 20 and the first side surface 21F, a second connecting surface 22G connecting the flat surface part 20 and the second side surface 21G, and a third connecting surface 22H connecting the flat surface part 20 and the third side surface 21H. The first connecting surface 22F is a secondary surface corresponding to a connecting part 13F. When seen from a thickness direction of the side wall part 12G, the first connecting surface 22F forms a roundness protruding toward the front surface side. A radius of a curvature of the roundness is 0.5 to 200 mm. The second connecting surface 22G is a secondary surface corresponding to a connecting part 13G. When seen from a thickness direction of the side wall part 12F, the second connecting surface 22G forms a roundness protruding toward the front surface side. A radius of a curvature of the roundness is 0.5 to 200 mm. The third connecting surface 22H is a tertiary surface corresponding to a connecting part 13H. The tertiary surface forms a curved surface having a component bent with reference to two axes. The third connecting surface 22H has a curved component of the third side surface 21H and a curved component of the first connecting surface 22F and the second connecting surface 22G.

The method for manufacturing the sheet laminate 1 according to the present embodiment and a mold 100 for molding the sheet laminate 1 are described next with reference to FIG. 4 through FIG. 10.

Figure 5:
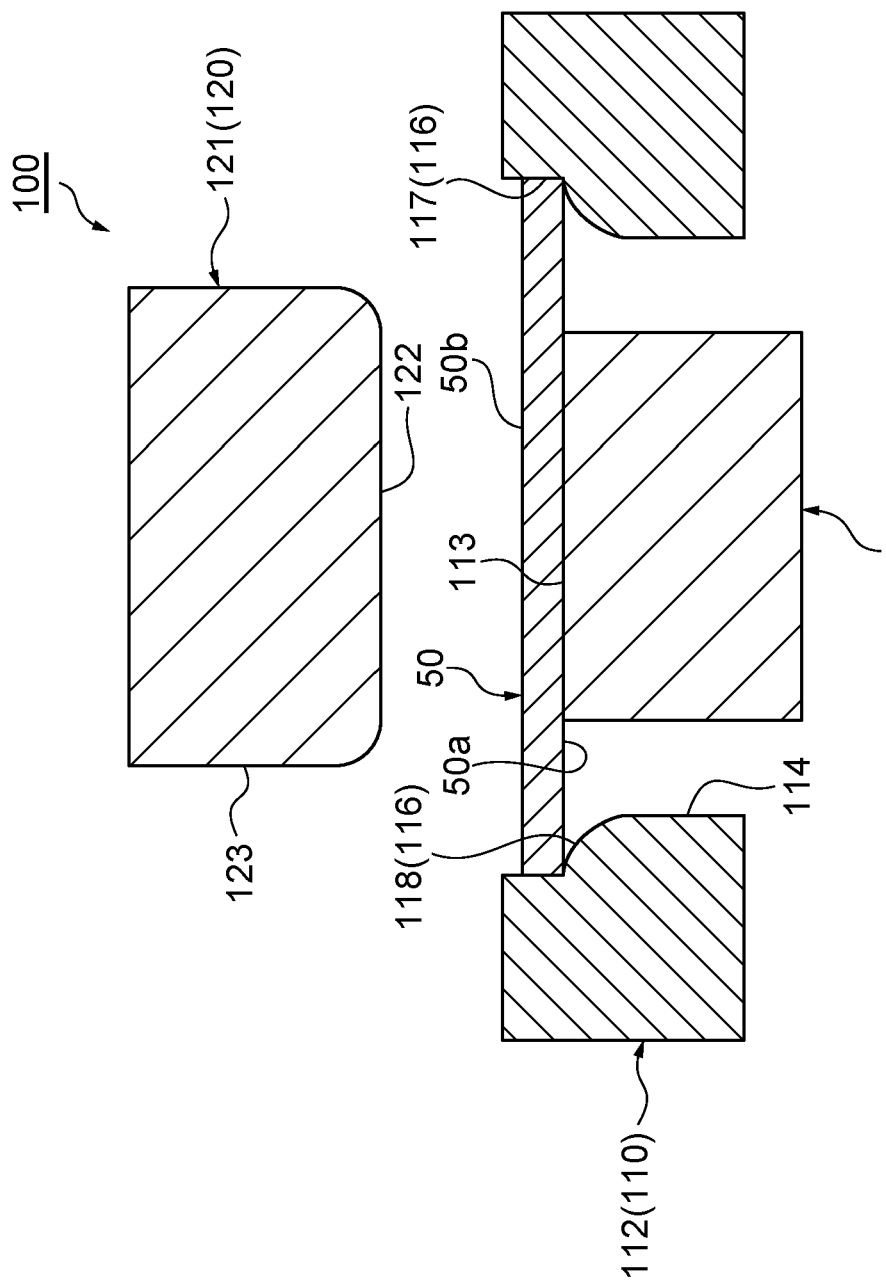
FIG. 5 is a cross sectional view illustrating a mold according to a present embodiment.
Figure 6:
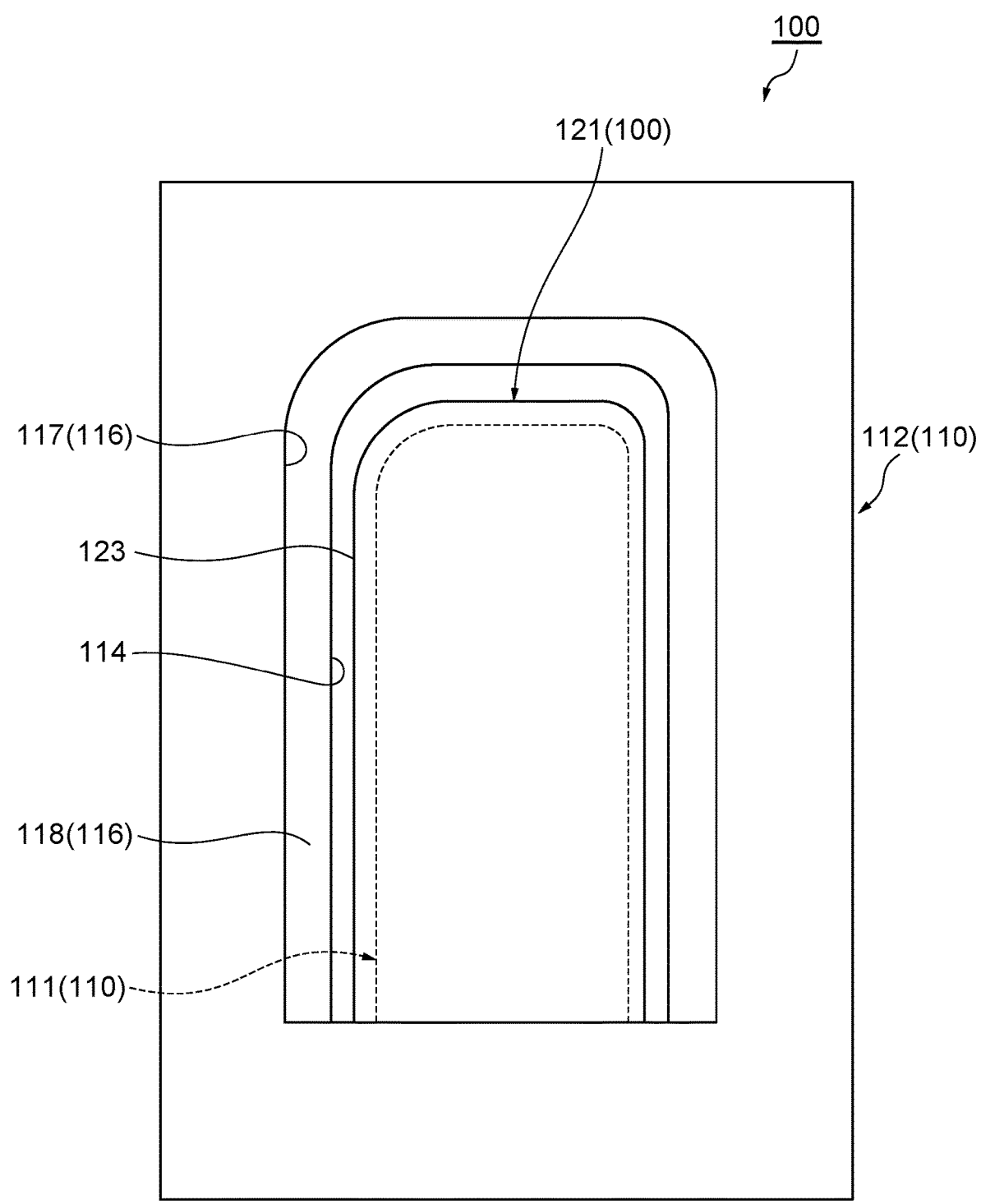
FIG. 6 is a plan view of the mold illustrated in FIG. 5.
Figure 7:
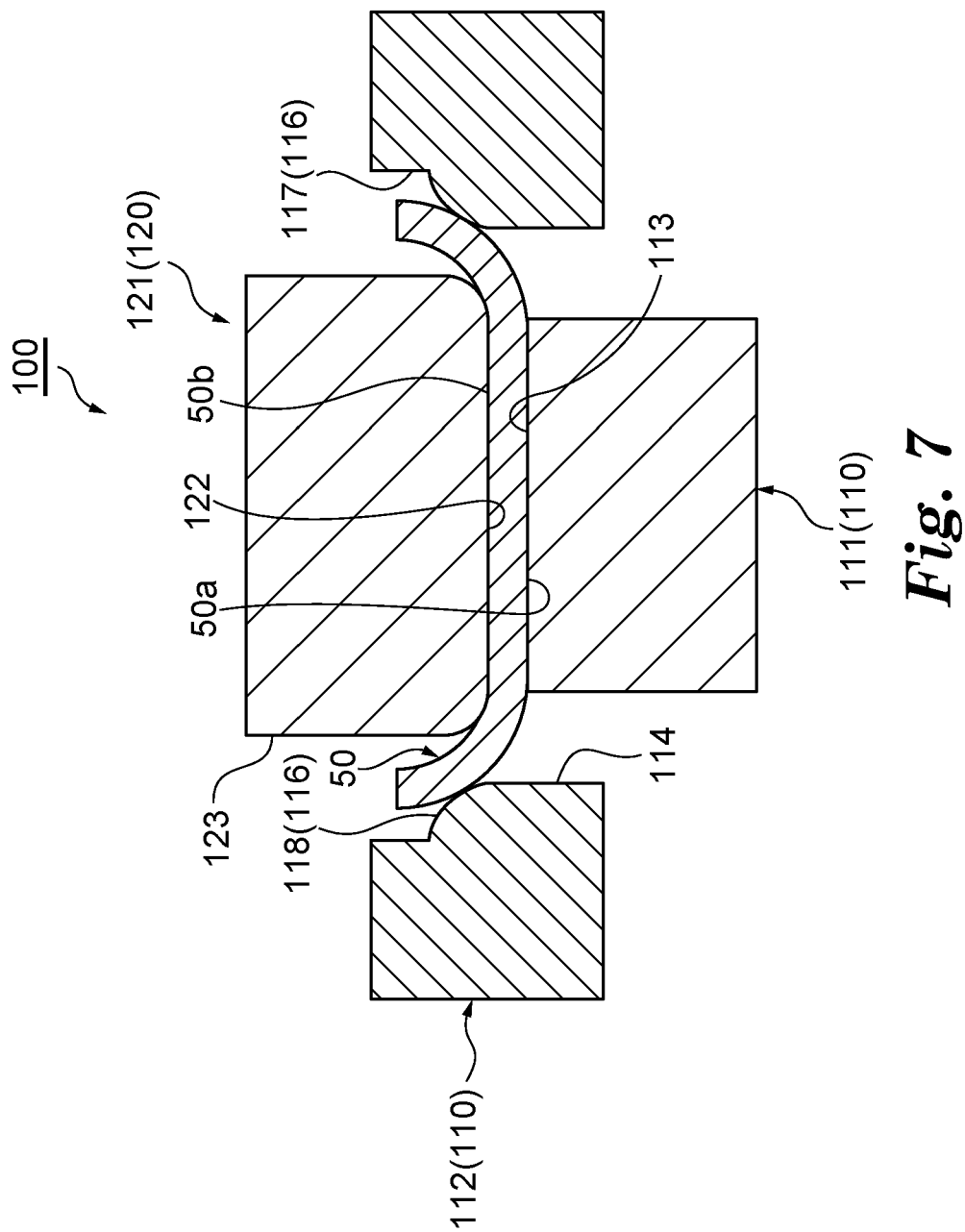
FIG. 7 is a cross sectional view illustrating the operation of a mold in the method for manufacturing the sheet laminate.

A configuration of the mold 100 for molding the sheet laminate 1 will be described first. The mold 100 is a mold for molding the sheet laminate 1 to be affixed to an adherent surface of an object. As illustrated in FIG. 5, the mold 100 is provided with a first unit 110 a second unit 120. The first unit is a unit for supporting a sheet member 50, having a front surface 50a to become a design surface and a rear surface 50b on which the adhesive part 3 is formed, from the front surface 50a side. The second unit 120 is a unit for supporting the sheet member 50 from the rear surface 50b side. The first unit 110 and the second unit 120 are able to mold the main body part 11 spreading in a flat plate shape portion of the sheet laminate 1, and the side wall parts 12 extending respectively toward the rear surface 50b side from mutually intersecting side parts of the main body part 11 by sandwiching the sheet member and bending an edge part of the sheet member 50. Note that what is described here is the mold 100 for molding the sheet laminate 1 having the shape illustrated in FIG. 1. That is, this is a description of the mold 100 for molding the sheet laminate 1 having the side wall parts 12A through 12F. However, because the form of the sheet laminate 1 is not particularly limited, the configuration of the mold 100 can be changed appropriately to match the form of the sheet laminate 1.

The first unit 110 is provided with a first piece 111 for supporting the flat surface part 20 of the main body part 11, and a second piece 112 for supporting each surface of the side wall part 12. When seen from a thickness direction, the first piece 111 is configured as a block forming a rectangular shape to match the form of the flat surface part 20 of the main body part 11 (see FIG. 6). An upper surface of the first piece 111 is configured as a supporting surface 113 for making contact with and thus supporting the flat surface part 20 of the main body part 11. When seen from a thickness direction, the second piece 112 is configured as a frame member having an opening that matches the form of the side surface 21 of the side wall part 12 (see FIG. 6). A third piece 121 of the second piece 112 and of the second unit 120 to be described later is provided inside the opening of the second piece 112.

An inner circumferential surface of the opening of the second piece 112 is configured as a supporting surface 114 for supporting the side surface 21 of the side wall part 12. Furthermore, an arranging part 116 for arranging the previously molded sheet member 50 is formed near an upper edge of the opening of the second piece 112. The arranging part 116 faces an end part of an outer circumferential side of the sheet member 50, and has an aligning surface 117 for performing alignment in a plane direction of the sheet member 50. The arranging part 116 also has a guide surface 118 for smoothly guiding (see FIG. 7) the side wall part 12 toward the supporting surface 114 side when an edge part of the sheet member 50 is bent during molding. Note that while the guide surface 118 is a curved surface curved so as to protrude outward in the present embodiment, said surface may be an inclined surface extending in a straight manner.

The second unit 120 is provided with a third piece 121 for pressing the sheet member 50 from the rear surface 50b side toward the front surface 50a side. A lower surface of the third piece 121 is configured as a supporting surface 122 for pressing the rear surface side of the main body part 11 of the sheet laminate 1. Furthermore, an outer circumferential surface of the third piece 121 is configured as a supporting surface 123 for making contact with and thus supporting the rear surface side (surface on the opposite side of the side surface 21) of the side wall part 12 of the sheet laminate 1. During molding, the side wall part 12 is sandwiched by the supporting surface 114 of the second piece 112 and the supporting surface 123 of the third piece 121 (see FIG. 8). Accordingly, a dimension in a horizontal direction gap between the supporting surface 114 and the supporting surface 123 is set to a thickness dimension of the side wall part 12.

At least during the execution of a partial heating step to be described later, the first unit 110 supports the flat surface part 20 and the side surface 21 (first side surface, second side surface, and third side surface), in a state where the connecting surface 22 (first connecting surface, second connecting surface, and third connecting surface) of the sheet laminate 1 is exposed. That is, in FIG. 3 (a), the connecting surfaces 22B, 22C, and 22E are exposed from the first unit 110, and the flat surface part 20 and the side surfaces 21B, 21C, and 21E are supported by the first unit 110.

Figure 4:
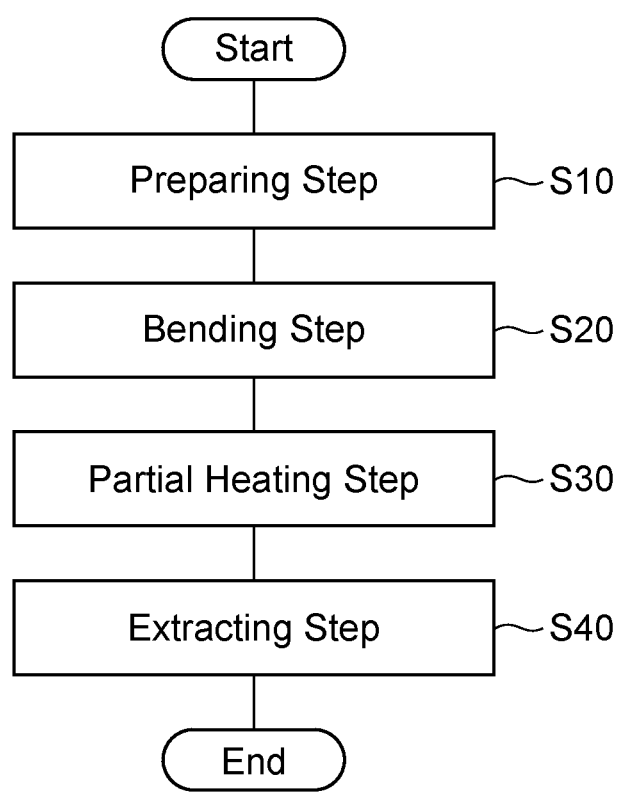
FIG. 4 is a drawing illustrating steps of a method for manufacturing the sheet laminate.

A manufacturing step of the method for manufacturing the sheet laminate 1 will be described next with reference to FIG. 4. As illustrated in FIG. 4, the method for manufacturing the sheet laminate 1 includes a preparing step S10, a bending step S20, a partial heating step S30, and an extracting step S40.

The preparing step S10 is a step for preparing the sheet member 50. In the preparing step S10, the sheet member 50 is pre-cut to a form that matches the mold 100. Furthermore, the prepared sheet member 50 is provided in the arranging part 116 of the second piece 112 of the mold 100 (see FIG. 5).

The bending step S20 is a step for bending an edge part of the sheet member 50 by sandwiching the sheet member 50 from the front surface 50a side and the rear surface 50b side. By lowering the third piece 121 of the second unit 120 downward in the bending step S20, the rear surface 50b of the sheet member 50 is pressed downward by the supporting surface 122 (see FIG. 7). At this time, the front surface 50a of the sheet member 50 may be supported by the supporting surface 113 of the first piece 111 of the first unit 110. At this time, an edge part of the sheet member 50 abuts with the guide surface 118 of the arranging part 116, which guides said member toward the supporting surface 114 side while thus bending said part toward the rear surface 50b side.

Figure 8:
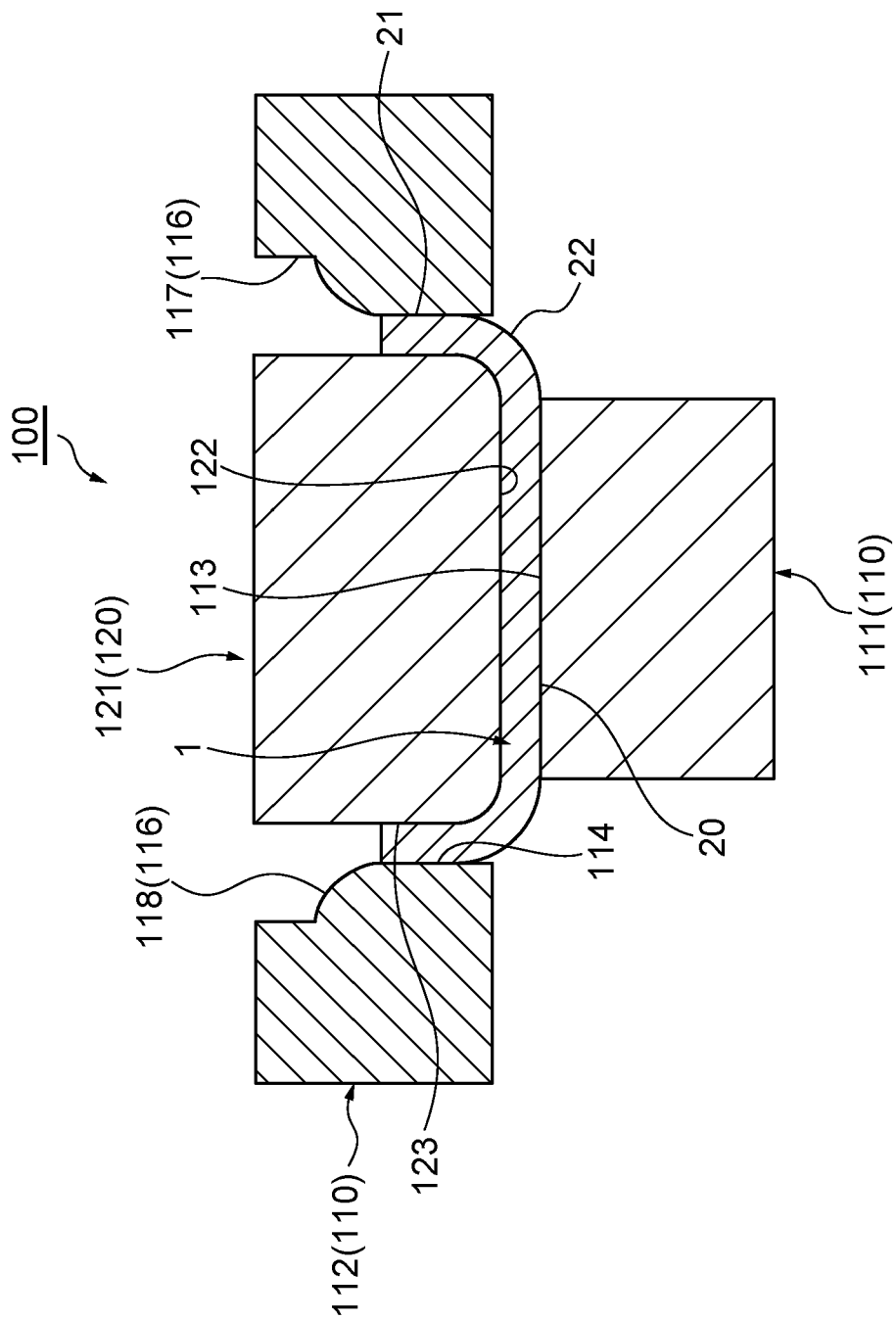
FIG. 8 is a cross sectional view illustrating the operation of a mold in the method for manufacturing the sheet laminate.
Figure 9:
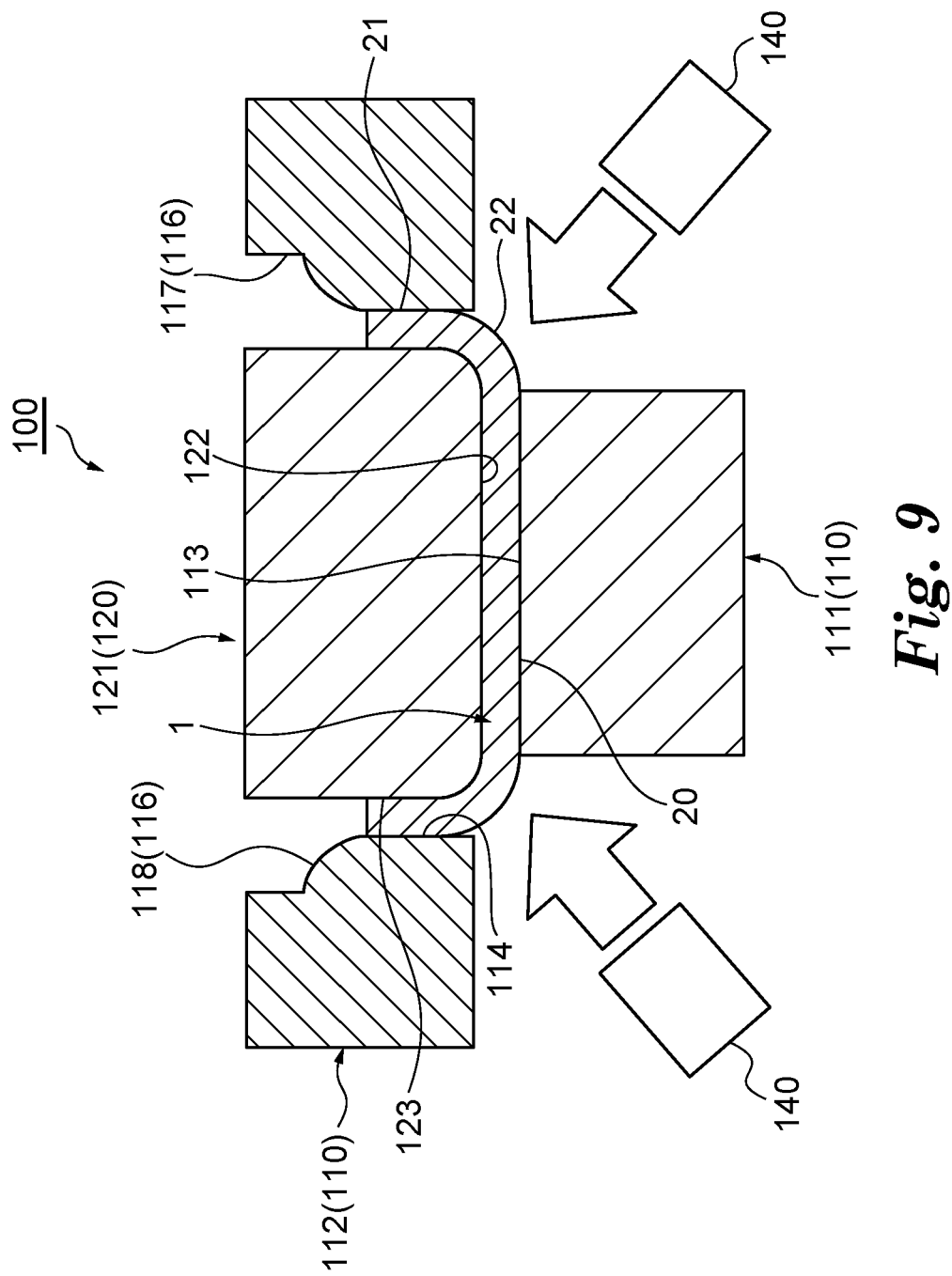
FIG. 9 is a cross sectional view illustrating the operation of a mold in the method for manufacturing the sheet laminate.

When the third piece 121 is lowered all the way down, an edge part of the sheet member 50 is sandwiched between the supporting surface 114 of the first piece 111 of the first unit and the supporting surface 123 of the third piece 121 of the second unit (see FIG. 8). This forms the side wall part 12 of the sheet laminate 1. Furthermore, the rear surface 50b of the sheet member 50 is sandwiched between the supporting surface 122 of the third piece and the supporting surface 113 of the second piece 112. This forms the main body part 11 of the sheet laminate 1. Furthermore, by pressing a curved part of a corner of the third piece, a corner between the main body part 11 and the side wall part 12 forms the bent connecting part 13. In this state, the first unit 110 is supporting the flat surface part 20 and the side surface 21 in a state where the connecting surface 22 of the sheet laminate 1 is exposed.

The partial heating step S30 is a step for heating part of the bent sheet member 50. The partial heating step S30 heats the connecting surface 22 exposed from the first unit 110 but does not heat the flat surface part 20 or the side surface 21 being supported and covered by the first unit 110 (see FIG. 9). This anneals the bent connecting part 13, which was significantly bent in the bending step, to thus remove distortion produced in said part. A predetermined heating device 140 is provided with respect to the connecting part 13, and the heating device 140 supplies heat. The heating device 140 may heat the connecting surface 22 by supplying, for example, infrared rays (IR), heated air, high pressure steam, or heated liquid. Or, a heating pad itself may be pressed against the connecting surface 22, or housed inside a heating furnace for each mold.

Figure 10:
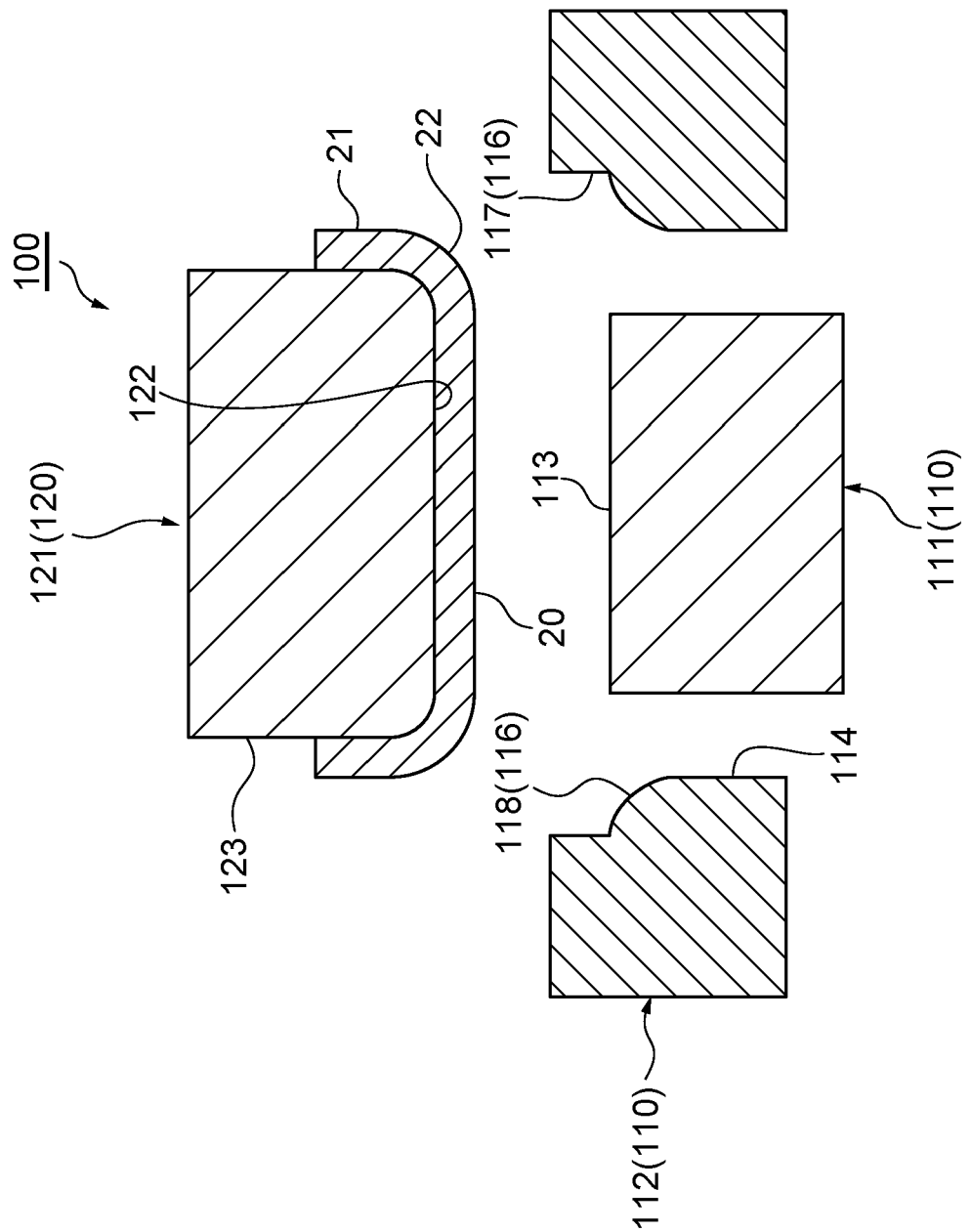
FIG. 10 is a cross sectional view illustrating the operation of a mold in the method for manufacturing the sheet laminate.

After the partial heating step S30 has completed, the extracting step S40 extracts the sheet laminate 1 from the mold 100 by raising the third piece 121 together with the sheet laminate 1 (see FIG. 10). Note that after the partial heating step S30 has completed, the connecting surface 22 may be cooled through contact with cooling air, a cooling liquid, or a cooling pad. Or, the connecting surface 22 may be cooled naturally by letting said surface stand. The manufacturing step illustrated in FIG. 4 is complete when the extracting step S40 ends.

The operations and effects of the method for manufacturing the sheet laminate 1, the mold 100 for molding the sheet laminate 1, and the sheet laminate 1 according to the present invention will be described next. Note that the part illustrated in FIG. 3 (*a*) will be used as an example for describing the "flat surface part," "first side surface," "second side surface," "third side surface," "first connecting surface," "second connecting surface," and "third connecting surface" in the following description. However, the same operations and effects can be obtained for other parts having the same gist in the sheet laminate 1.

A method for manufacturing a sheet laminate according to a comparative example will be described first. Examples of methods for manufacturing according to the comparative example include heat stamping which sandwiches a sheet in a heated mold, and then bends the sheet. However, in cases where an edge part of a sheet member having an adhesive part on a rear surface is bent, a problem occurs when heat stamping is performed where the adhesive part peels during molding.

By contrast, with the method for manufacturing the sheet laminate 1 according to the present embodiment, the sheet laminate 1 has the flat surface part 20 spreading out in a flat plate shape, the side surface 21 on which an edge part bent by the bending step is configured, and the connecting surface 22 protruding and curving toward the front surface side between the flat surface part 20 and the side surface 21. After the sheet member 50 has been bent into this kind of shape in the bending step, the connecting surface 22 is partially heated in the partial heating step. When the sheet member 50 is molded in a state where the adhesive part 3 or the protective film 6 has been formed, the adhesive part 3 or the protective film 6 become susceptible to peeling in a position corresponding to the connecting surface 22 that deforms so as to curve in the bending step. Accordingly, distortion in said part can be removed by partially removing stress (performing an annealing process) through partial heating of the connecting surface 22. Therefore, the sheet laminate 1 can be manufactured with good quality while preventing peeling of the adhesive part 3 and the protective film 6.

The merits of partially heating the connecting surface 22 will be described here. For example, if stamping is done in a state where the adhesive part 3, the protective film 6, and the release liner 4 have been heated and softened, the adhesive part 3 and the protective film 6 may displace due to a shear force between molds, which can lead to peeling (the impact from displacement caused by the adhesive part 3 is particularly significant). To prevent this, heating is performed in a static state after stamping has been performed without heating. Additionally, movement of a peripheral part (here this is a flat surface part or side surface of a periphery of the connecting surface 22), other than a major curved part where stress is to be relaxed by heating, is suppressed by keeping said part sandwiched between molds, and this part is also not softened through heating. This makes it possible to prevent layers from peeling due to the displacement of a part (that is a part corresponding to the connecting surface 22) to be partially heated sandwiched in the peripheral part.

The method for manufacturing the sheet laminate 1 molds the main body part 11 for configuring the flat surface part 20 portion of the sheet laminate 1, and the pair of side wall parts 12B and 12C extending respectively toward the rear surface side from the pair of mutually intersecting side parts 11*b* and 11*c* of the main body part 11. In the example in FIG. 3 (*a*), the side surface 21 has the first side surface 21B corresponding to the side wall part 12B, the second side surface 21C corresponding to the side wall part 12C, and the third side surface 21E formed in the corner between the first side surface 21B and the first side surface 21C forming a roundness having a predetermined curvature. The connecting surface 22 may have the first connecting surface 22B connecting the flat surface part 20 and the first side surface 21B, the second connecting surface 22C connecting the flat surface part 20 and the second side surface 21C, and the third connecting surface 22E connecting the flat surface part 20 and the third side surface 21E.

The connecting surface 22 is exposed from the mold 100 in the partial heating step, and partial heating is performed by applying heat to the connecting surface 22 from outside the mold 100. This enables the connecting surface to be partially heated using a simple configuration.

The sheet member 50 is also provided with the release liner 4 for covering the adhesive part 3 of the rear surface 50*b* of the sheet member 50. This enables molding to be performed in a state where the adhesive part 3 is protected.

The mold 100 for molding the sheet laminate 1 is the mold 100 for molding the sheet laminate 1 to be affixed to the adherent surface of an object, and is provided with the first unit 110 for supporting the sheet member 50, having the front surface 50*a* to become the design surface and the rear surface 50*b* in which the adhesive part 3 has been formed, from the front surface 50*a* side, and the second unit 120 for supporting the sheet member 50 from the rear surface 50*b* side. The first unit 110 and the second unit 120 are able to mold the main body part 11 spreading in a flat plate shape portion of the sheet laminate 1, and the pair of side wall parts 12B and 12C extending respectively toward the rear surface 50*b* side from the pair of mutually intersecting side parts 11*b* and 11*c* of the main body part 11 by sandwiching the sheet member 50 and then bending the sheet member 50. When the front surface is formed on the flat surface part 20 corresponding to the main body part 11, the first side surface 21B corresponding to the side wall part 12B, the second side surface 21C corresponding to the side wall part 12C, and in a corner between the first side surface 21B and the second side surface 21C; and has the third side surface 21E forming a roundness having a predetermined curvature, the first connecting surface 22B protruding and curving toward the front surface side for connecting the flat surface part 20 and the first side surface 21B, the second connecting surface 22C protruding and curving toward the front surface side for connecting the flat surface part 20 and the second side surface 21C, and the third connecting surface 22E protruding and curving toward the front surface side for connecting the flat surface part 20 and the third side surface 21E, the first unit 110 supports the flat surface part 20, the first side surface 21B, the second side surface 21C, and the third side surface 21E in a state where the first connecting surface 22B, the second connecting surface 22C, and the third connecting surface 22E are exposed.

Using a mold like the mold 100 makes it possible to execute a manufacturing method like that described above, and to obtain the same operation and effect.

The sheet laminate 1 is the sheet laminate 1 that is to be affixed to an adherent surface of an object and has the flat surface part 20 that spreads out in a flat plate shape, the side surface 21 configured by a bent edge of the flat surface part 20, and the connecting surface 22 protruding and curving toward the front surface side between the flat surface part 20 and the side surface 21, where the part configuring the flat surface part 20, the side surface 21, and the connecting surface 22 is configured of the base material part 2 having the front surface that is to become the design surface, and the rear surface on the side opposite the front surface, an adhesive part 3 formed on the rear surface of the base material part 2, and the release liner 4 covering the adhesive part 3 that can be peeled from the adhesive part 3.

Using a laminate like the sheet laminate 1 enables achieving an operation and effect during manufacture having the same gist as the manufacturing method described above.

The sheet laminate 1 is provided with the main body part 11 for configuring the flat surface part 20, and the pair of side wall parts 12B and 12C extending respectively toward the rear surface side from the pair of mutually intersecting side parts 11b and 11c of the main body part 11. The side surface 21 has the first side surface 21B corresponding to the side wall part 12B, the second side surface 21C corresponding to the side wall part 12C, and the third side surface 21E formed in the corner between the first side surface 21B and the second side surface 21C forming a roundness having a predetermined curvature. The connecting surface 22 has a first connecting surface 22B for connecting the flat surface part 20 and the first side surface 21B, a second connecting surface 22C for connecting the flat surface part 20 and the second side surface 21C, and a third connecting surface 22E for connecting the flat surface part 20 and the third side surface 21E. The manufacturing method according to the present embodiment becomes particularly noteworthy when the sheet laminate 1 having this type of configuration is manufactured.

The third side surface 21E forms a roundness protruding toward the front surface side, and the curvature of the roundness has a radius of 1 to 2000 mm.

In the example in FIG. 3 (b), the third side surface 21H forms a roundness protruding toward the rear surface side, and the curvature of the roundness has a radius of 0.5 to 2000 mm.

The base material part 2 is covered by the biaxially extended protective film 6. This makes it possible to protect a front surface of the base material part 2.

The release liner 4 is configured using a biaxially extended film. This makes it possible to reduce an impact on the release liner 4 during partial heating of the connecting surface.

For example, the adhesive part 3 is configured using an acrylic pressure-sensitive adhesive. For example, the base material part is configured using a polycarbonate.

The present invention is not intended to be limited to the embodiments described above.

Figure 11:
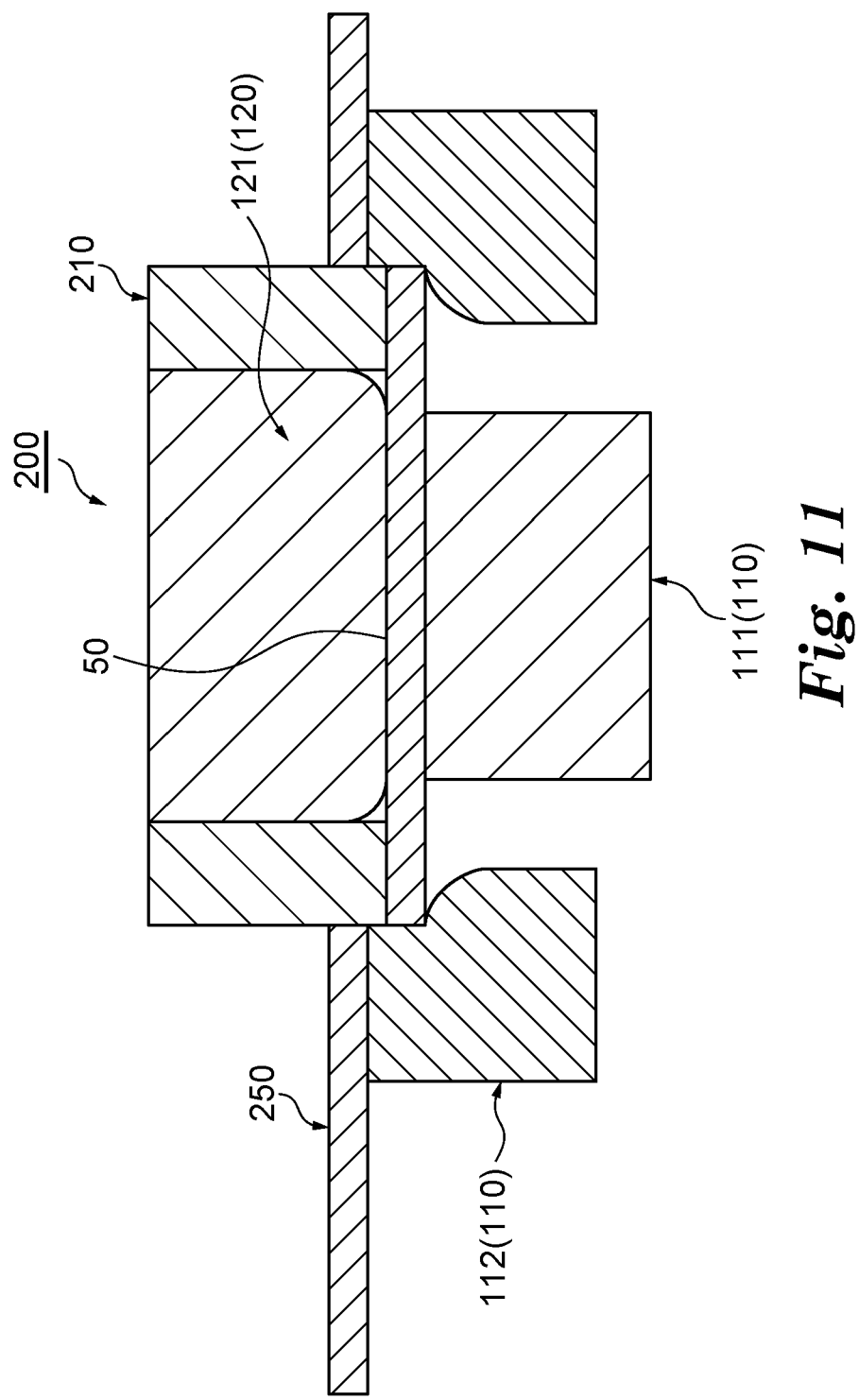
FIG. 11 is a cross sectional view illustrating a mold according to a modified example.
Figure 12:
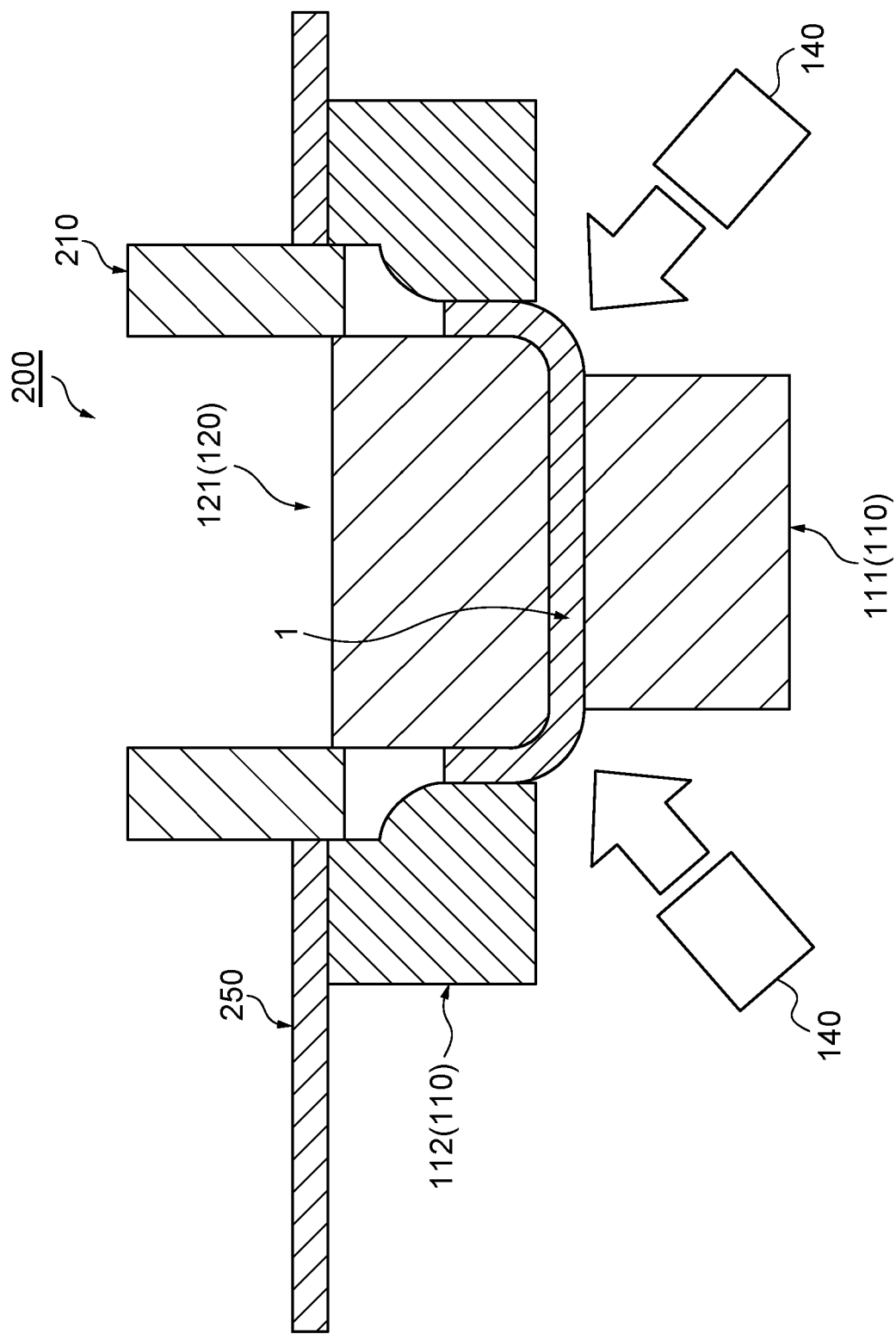
FIG. 12 is a cross sectional view illustrating a mold according to a modified example.

In the embodiments described above, the sheet member 50 is provided in the mold 100 after having been cut beforehand. However, an un-cut sheet member that is not cut until it is supplied in the mold may also be used. For example, a cutting member 210 may be provided on an outer circumferential side of the third piece 121 of the first unit 110, as illustrated in FIG. 11 and FIG. 12. For example, a base material 250 of a sheet member is cut by the cutting member 210 simultaneous to pressurization in the third piece 121 to thus form the sheet member 50 in a desired shape. Note that the cutting member 210 is retracted upward after the cutting, as illustrated in FIG. 12.

Figure 13:
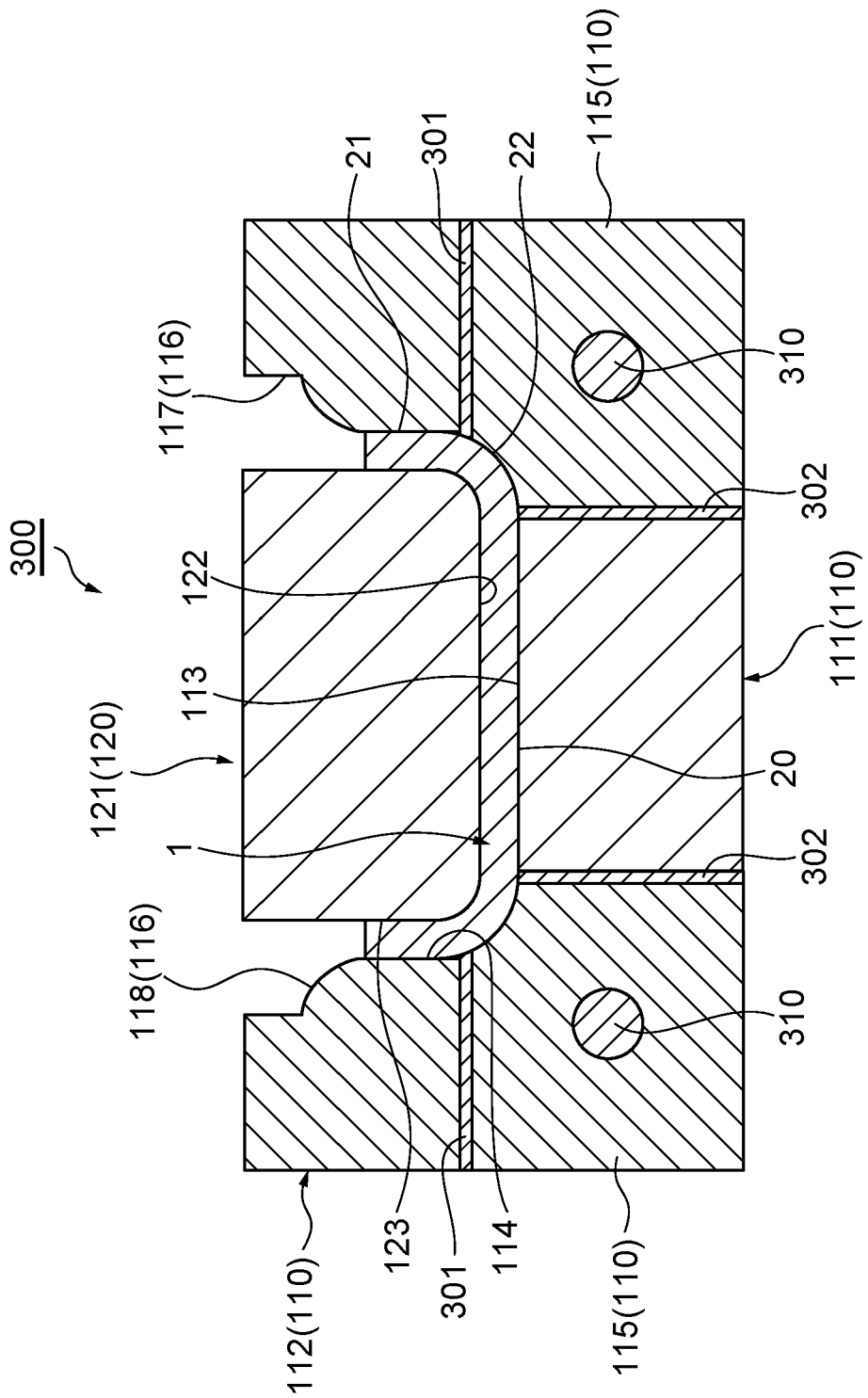
FIG. 13 is a cross sectional view illustrating a mold according to a modified example.

Note that in the embodiments described above, the connecting surface to be partially heated was exposed from the mold. In addition, the first unit has a piece for supporting the connecting surface, and may partially heat the connecting surface through said piece. Specifically, as illustrated in FIG. 13, in a mold 300, the first unit 110 is provided with a heating part 310 provided with a fourth piece 115 that makes contact with the connecting surface (first connecting surface, second connecting surface, and third connecting surface) 22, for heating the part making contact, an insulating part 302 for insulating a space between the flat surface part 20 and the heating part 310, and an insulating part 301 for insulating a space between the side surface (first side surface, second side surface, and third side surface) 21 and the heating part 310, and for insulating the insulating part 301. The heating part 310 may be configured using a flow path, and the like, of a heating medium such as a heating wire, a liquid, a gas, or the like.

According to the description above, in the method for manufacturing the sheet laminate 1, partial heating is performed in the partial heating step through a part (the fourth piece 115) in the mold 300 that makes contact with the connecting surface 22. Furthermore, heat going to the flat surface part 20 and the side surface 21 is insulated in the partial heating step. This kind of configuration allows partial heating to be performed while a shape is sustained because the connecting surface 22 is supported by the fourth piece 115. Note that if the fourth piece 115 does not have the heating part 310, the fourth piece 115 is retracted during the partial heating step, and partial heating may be performed by exposing the connecting surface 22.

The invention claimed is:

1. A method for manufacturing a sheet laminate to be affixed to an adherent surface of an object comprising:
   providing a sheet member having:
      a) a front surface to become a design surface and
      b) a rear surface on which an adhesive part has been formed;
   bending an edge part of the sheet member by sandwiching the sheet member from a front surface side and a rear surface side in a mold to create the sheet laminate; and
   wherein the sheet laminate has a flat surface part spreading out in a flat plate shape, a side surface on which an edge part bent by said bending is configured, and a connecting surface protruding and curving toward the front surface side between the flat surface part and the side surface,
   partially heating the connecting surface after the side surface is molded in the said bending, and
   wherein the connecting surface does not contact the mold during the partial heating, and partial heating is performed by applying heat to the connecting surface from outside the mold.

2. The method for manufacturing a sheet laminate according to claim 1, wherein said bending further comprises;

forming a main body part for configuring the flat surface part of the sheet laminate, and forming a pair of side wall parts each extending respectively toward the rear surface side from a pair of mutually intersecting side parts of the main body, wherein the side surface has a first side surface corresponding to one side wall part of the pair of side wall parts, a second side surface corresponding to the other side wall part of the pair of side wall parts, and a third side surface forming a roundness having a predetermined curvature formed in a corner part between the first side surface and the second side surface, and the connecting surface has a first connecting surface for connecting the flat surface part and the first side surface, a second connecting surface for connecting the flat surface part and the second side surface, and a third connecting surface for connecting the flat surface part and the third side surface.

3. The method for manufacturing a sheet laminate according to claim 1, wherein partial heating is performed in said heating through a part in the mold that makes contact with the connecting surface.

4. The method for manufacturing a sheet laminate according to claim 3, wherein heat going to the flat surface part and the side surface is insulated in said heating.

5. The method for manufacturing a sheet laminate according to claim 1, wherein the sheet member is also provided with a release liner covering the adhesive part of the rear surface of the sheet member.

6. The method for manufacturing a sheet laminate according to claim 1, wherein the mold comprises:

a first unit for supporting a sheet member from a front surface side, where the sheet member has a front surface to become a design surface and a rear surface where an adhesive part has been formed; and a second unit for supporting the sheet member from a rear surface side;

wherein the first unit and the second unit are able to mold the sheet member so that a main body part is spread in a flat plate shape and a pair of side wall parts extend respectively toward a rear surface side from a pair of mutually intersecting main body part side parts by sandwiching the sheet member and bending an edge part of the sheet member; and when the front surface of the sheet member has a flat surface part corresponding to the main body part, a first side surface corresponding to one side wall part of the pair of side wall parts, a second side surface corresponding to the other side wall part of the pair of side wall parts, and a third side surface forming a roundness having a predetermined curvature formed in a corner part between the first side surface and the second side surface, and the sheet member further comprises a first connecting surface protruding curving toward the front surface side for connecting the flat surface part and the first side surface, a second connecting surface protruding curving toward the front surface side for connecting the flat surface part and the second side surface, and a third connecting surface protruding curving toward the front surface side for connecting the flat surface part and the third side surface.

* * * * *